United States Patent
Esliger et al.

(10) Patent No.: US 9,940,109 B2
(45) Date of Patent: Apr. 10, 2018

(54) APPLICATION PROFILE DRIVEN SCHEDULING AND CONFIGURATION IN A SYSTEM ON A CHIP

(71) Applicant: QUALCOMM INCORPORATED, San Diego, CA (US)

(72) Inventors: James Lyall Esliger, Richmond Hill (CA); Wilson Kwan, Toronto (CA); Mark Bapst, South Barrington, IL (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/803,110

(22) Filed: Jul. 20, 2015

(65) Prior Publication Data

US 2017/0024191 A1 Jan. 26, 2017

(51) Int. Cl.
*G06F 9/45* (2006.01)
*G06F 1/32* (2006.01)
(Continued)

(52) U.S. Cl.
CPC ............... *G06F 8/41* (2013.01); *G06F 1/324* (2013.01); *G06F 1/329* (2013.01); *G06F 1/3296* (2013.01);
(Continued)

(58) Field of Classification Search
CPC .... G06F 8/443–8/4443; G06F 11/3612; G06F 11/34; G06F 11/3409–11/3433;
(Continued)

(56) References Cited

U.S. PATENT DOCUMENTS 7,886,283 B2 * 2/2011 Nacul .................... G06F 8/456
717/137
8,161,304 B2 * 4/2012 Hamilton .............. G06F 1/3203
711/113
(Continued)

OTHER PUBLICATIONS

Anonymous: "PAPI", Jun. 28, 2015 (Jun. 28, 2015), XP055304535, Retrieved from the Internet: URL: https://web.archive.org/web/20150628081113/http://icl.cs.utk.edu/papi/overview/index.html [retrieved on Sep. 21, 2016].
(Continued)

*Primary Examiner* — Emerson Puente
*Assistant Examiner* — Erika Kretzmer
(74) *Attorney, Agent, or Firm* — Smith Tempel Blaha LLC

(57) ABSTRACT

Various embodiments of methods and systems for proactive resource allocation and configuration are disclosed. An exemplary method first compiles and links a profile instrumented application with a compiler comprising a profile guided optimization feature that inserts calls to a profiler runtime. The profile instrumented application is executed on a target device using one or more workload datasets representative of probable workloads. During execution, based on recognition of the inserted calls, an instrumentation-based profile dataset is generated in association with each of the one or more workload datasets. Next, the profile instrumented application is recompiled and relinked based on the instrumentation-based profile datasets to create a set of profile guided optimizations to the source code, thereby resulting in an optimized application. The optimized application may be executed and monitored to generate a revised profile dataset useful for providing instructions to the target device for optimal workload allocation and resource configuration.

18 Claims, 6 Drawing Sheets

(51) Int. Cl.
*G06F 11/34* (2006.01)
*G06F 9/50* (2006.01)
*G06F 9/44* (2018.01)

(52) U.S. Cl.
CPC ............... *G06F 8/443* (2013.01); *G06F 8/71* (2013.01); *G06F 9/50* (2013.01); *G06F 11/3409* (2013.01); *G06F 11/3442* (2013.01); *Y02B 60/142* (2013.01)

(58) Field of Classification Search
CPC ............. G06F 11/3466; G06F 11/3476; G06F 11/3414; G06F 2201/86; G06F 9/5027–9/5055; G06F 9/5094; G06F 8/4432
USPC ......................................................... 717/158
See application file for complete search history.

(56) References Cited

U.S. PATENT DOCUMENTS

| | | | |
|---|---|---|---|
| 8,205,200 B2* | 6/2012 | Liao | G06F 9/485 712/220 |
| 8,584,106 B2 | 11/2013 | Papakipos et al. | |
| 8,935,683 B2 | 1/2015 | Brackman | |
| 8,959,495 B2 | 2/2015 | Chafi et al. | |
| 8,966,462 B2 | 2/2015 | Gounares et al. | |
| 2006/0112377 A1* | 5/2006 | Nacul | G06F 8/456 717/140 |
| 2007/0124732 A1* | 5/2007 | Liao | G06F 9/4881 718/102 |
| 2010/0185883 A1* | 7/2010 | Hamilton | G06F 1/3203 713/320 |
| 2013/0080760 A1 | 3/2013 | Li et al. | |
| 2014/0278337 A1* | 9/2014 | Branson | G06F 11/3457 703/22 |
| 2016/0196112 A1* | 7/2016 | Edwards | G06F 8/30 717/107 |
| 2016/0328169 A1* | 11/2016 | Hassan | G06F 3/0625 |

OTHER PUBLICATIONS

Anonymous: "Profile-Guided Optimization—Wikipedia, the free encyclopedia", Mar. 4, 2015 (Mar. 4, 2015), XP055303907, 2 pages. Retrieved from the Internet: URL: https://en.wikipedia.org/w/index.php? title=Profileguided_optimization&oldid=649802291 [retrieved on Sep. 20, 2016].

International Search Report and Written Opinion—PCT/US2016/039369—ISA/EPO—Oct. 5, 2016 (152948WO).

Xiang L., et al., "Coordinating System Software for Power Savings", Second International Conference on Future Generation Communication and Networking, 2008. FGCN '08, IEEE, Piscataway, NJ, USA, XP031384016, Dec. 13, 2008 (Dec. 13, 2008), pp. 222-225, ISBN: 978-07695-3431-2.

* cited by examiner

APPLICATION PROFILE DRIVEN SCHEDULING AND CONFIGURATION IN A SYSTEM ON A CHIP

DESCRIPTION OF THE RELATED ART

Portable computing devices ("PCDs") have become ubiquitous in society. Users rely on their PCDs to conduct purchase transactions, organize schedules, capture video, provide entertainment, research information, communicate via email, text and voice, generate interactive maps, and generally provide countless other functionality. PCD designers make all this functionality happen by leveraging various systems on a chip ("SoC") that may all be packed into a relatively small form factor. A SoC may include a combination of any number of resources configured to work together for a common purpose or purposes. For example, resources that reside on a SoC may include processors (such as CPUs, DSPs, GPUs, modems, etc.), memory components (such as cache, package on package memory, double data rate memory, etc.), busses, power sources (such as batteries), controllers, sensors, transmitters and the like.

Simply put, the more functionality that is required, the more competition there is among software tasks for scheduling the capacity of the resources. Consequently, to keep a high level of quality of service ("QoS") to a user in the face of a demand for more and more functionality, designers are constantly seeking ways to more efficiently make use of the resources on a SoC.

Platform level scheduling of application software requests on resources is challenging for designers. Scheduling components within the SoC is critical for optimizing power consumption, consistently meeting processing deadlines and such other goals that collectively contribute to the overall goal of maintaining an acceptable QoS. Consequently, scheduling demands on resources and managing resource settings is important business for SoC designers. Notably, scheduling demands on resources and managing resource settings is also tricky business when tasks from many different applications with unknown or indeterminate needs are all queuing calls for a common resource. For that matter, scheduling demands on resources and managing resource settings is tricky even when there is only one task requesting resources, not just in the case of many. Assigning the right resource and resource performance level is difficult even in the single task case when the task resource demand profile is unknown.

In an effort to be efficient in calling resources, managing resource settings and prioritizing allocation of resources, prior art solutions rely on either fixed scheduling schemes (e.g., first in first out) or heuristic-based approaches that assume past demands of an application coupled with past performance of a resource will be indicative of future demands of the application and future performance of the resource. While heuristic-based solutions usually make for better resource management than purely fixed scheduling methods, the inability of known heuristic-based solutions to consider the instant performance needs of an application and/or the processing capacity of alternative available resources limits the amount of functionality that a typical SoC is capable of delivering to a user. Consequently, resource scheduling and configuration solutions known in the art are inefficient at allocating resources, marshaling resource availability, ramping up and/or ramping down resources, etc. Therefore, there is a need in the art for a resource scheduling and configuration solution that recognizes the future requirements of a running application(s) and schedules and configures resources in a proactive manner in order to optimize the tradeoff between power consumption and performance.

SUMMARY OF THE DISCLOSURE

Various embodiments of methods and systems for proactive resource allocation and configuration in a system on a chip ("SoC") are disclosed. An exemplary embodiment of the solution first compiles and links a profile instrumented program with a compiler comprising a profile guided optimization feature. The step of compiling and linking the profile instrumented application comprises inserting calls to a profiler runtime. The profile instrumented application is executed on a target device that includes a SoC (such as a portable computing device) using one or more workload datasets representative of probable or critical workloads for the target device. During execution, the profile instrumented application is monitored and, based on recognition of the inserted calls, an instrumentation-based profile dataset is generated in association with each of the one or more workload datasets. Next, the application is recompiled and relinked based on the instrumentation-based profile datasets. Recompiling and relinking the profile instrumented application comprises creating a set of profile guided optimizations to the source code, thereby resulting in an optimized application. The optimized application is a "shippable product" that may be executed and monitored to generate a revised profile dataset useful for providing instructions to the target device for optimal workload allocation and resource configuration.

Another exemplary embodiment of the solution for proactive resource allocation and configuration in a system on a chip starts with executing an application on a target device using one or more workload datasets that are representative of probable workloads. The application is monitored during its execution and a profile dataset is generated in association with each of the one or more workload datasets. The application may then be recompiled and relinked based on the profile datasets. Recompiling and relinking the application comprises creating a set of profile guided optimizations to the source code and generating an optimized application therefrom. The optimized application may then be executed and monitored to generate a revised profile dataset useful for providing instructions to the target device for workload allocation and resource configuration.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure or different figures. Letter character designations for reference numerals may be omitted when it is intended that a reference numeral encompass all parts having the same reference numeral in all figures.

DETAILED DESCRIPTION

Figure 1:
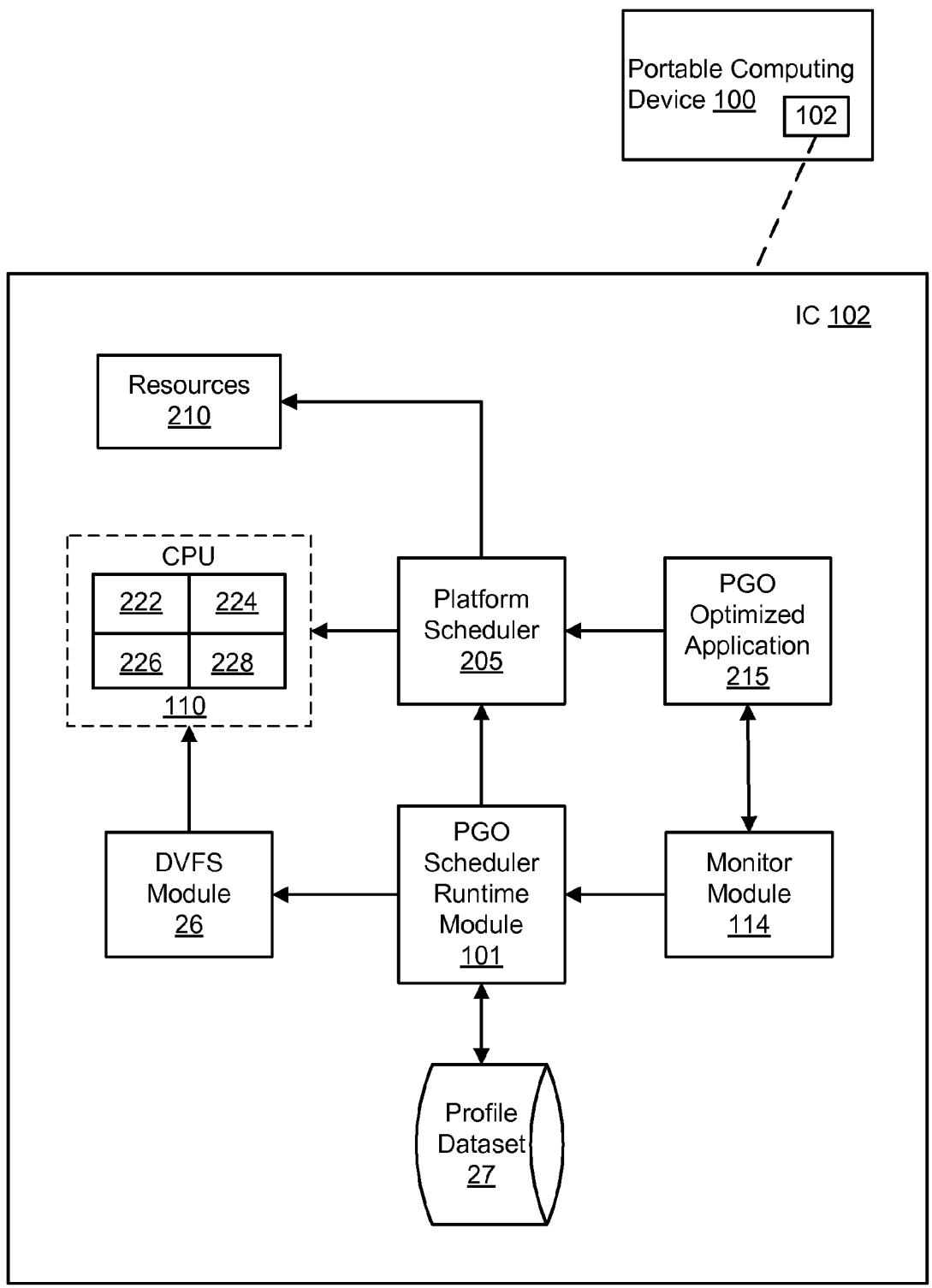
FIG. 1 is a functional block diagram illustrating an embodiment of an on-chip system for implementing proactive resource allocation and configuration ("PRAC") methodologies in a system on a chip ("SoC")

The word "exemplary" is used herein to mean "serving as an example, instance, or illustration." Any aspect described herein as "exemplary" is not necessarily to be construed as exclusive, preferred or advantageous over other aspects.

In this description, the terms "application" and "program" are used interchangeably and may also include files having executable content, such as: object code, scripts, byte code, markup language files, and patches. An application or program may comprise tasks to be performed by given resources, as would be understood by one of ordinary skill in the art. In addition, an "application" referred to herein may also include files that are not executable in nature, such as documents that may need to be opened or other data files that need to be accessed.

The term "compiler" is used herein to reference a program that processes statements written in a particular programming language and converts them into machine language or "object code" that may be executed by a processing component of a target device, such as a processing component residing on a system on a chip ("SoC"). The term "LLVM" or "LLVM compiler" is used herein in an exemplary manner and is not meant to suggest that the scope of the solutions is limited to use of an LLVM compiler. Specifically regarding an LLVM compiler, it would be understood by one of ordinary skill in the art to be a compiler infrastructure designed as a set of reusable libraries with well-defined interfaces. An LLVM compiler is written in C++ programming language and is designed for compile-time, link-time, run-time, and idle-time optimization of programs or applications written in arbitrary programming languages. Exemplary programming languages with compilers that use LLVM include, but may not be limited to, Common Lisp, ActionScript, Ada, D, Fortran, OpenGL Shading Language, Go, Haskell, Java bytecode, Julia, Objective-C, Swift, Python, Ruby, Rust, Scala, C# and Lua. LLVM may provide the middle layers of a complete compiler system, taking code from a compiler and generating an optimized code or intermediate representation ("IR"). The new optimized code may then be converted and linked into machine-dependent assembly code for a target platform, such as an execution environment of a SoC in a target device.

The term "linker" is used herein to reference a computer program that takes one or more object files generated by a compiler and combines them into a single executable file, library file, or another object file that may be executed by a processing component of a target device.

As used in this description, the term "runtime" references a gateway application by which a running program interacts with the execution environment of a target device. As would be understood by one of ordinary skill in the art, the execution environment or operating system running on a given SoC may contain state values and/or control resources that are accessed by a running program or application via its runtime. It may also contain one or more runtimes, such as a browser runtime, a Java runtime, as well as the operating system runtime.

The term "resource" is used herein to generally refer to any application, module, database, processing component or the like that may reside on a SoC in a target device and be called upon by an application running in an execution environment associated with the SoC. For example, a resource may be, but is not limited to being, a central processing unit ("CPU"), a digital signal processor ("DSP"), a graphical processing unit ("GPU"), a memory component, etc. As would be understood by one of ordinary skill in the art, a given resource may be configured to provide different levels of performance or capacity at the expense of power consumption, thermal energy generation, user experience, etc.

In this description and its figures, the term "system software" broadly encompasses any software entity associated with an execution environment such as, but not limited to, an operating system, power management logic, work scheduler module, dynamic control and voltage scaling module, etc.

In this description, the term "profile data," "profile dataset" and the like refer to a set of data describing the runtime behavior of a program or application. By way of example, and not limitation, a profile dataset may describe for a given application what functions are called the most, hot paths, block counts for LLVM blocks, call path info, number of threads, thread profiles, memory access patterns, cache usage, etc.

In this description, the term "profile guided optimization" refers to the process of recompiling and linking a program using profile information gathered from running the program in order to generate a further optimized version of the program.

In this description, the term "profile instrumented application" is in reference to an application that has been instrumented by the compiler to include calls (e.g., calls to a profile runtime) to collect profile data for that application. Profile data may be, but is not limited to being, block counts, function call counts, branch counts, etc. made during execution of the application. As would be recognized within the context of this disclosure by one of ordinary skill in the art, "profiling" is a form of dynamic program analysis that measures, for example, the memory space or time complexity of a program, the usage of particular instructions by the program, and/or the frequency and duration of function calls by the program. As would further be understood by one of ordinary skill in the art, "profiling" an application or program may be achieved by "instrumenting" either the program source code or its binary executable form using a tool called a profiler.

In this description, "instrumentation," "instrumented" and the like refers to an ability to monitor or measure the level of a program's performance, to diagnose errors and to write trace information. Instrumentation may be implemented in the form of code instructions that monitor specific components in a system. Notably, when a profile instrumented application contains instrumentation code, it may be managed using a management tool such as a runtime. As would be understood by one of ordinary skill in the art, instrumentation provides for reviewing the performance of an application.

As used in this description, the terms "component," "database," "module," "system," "processing component," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD or SoC that consumes various levels of power to operate at various levels of functional efficiency, one of ordinary skill in the art will recognize that the use of these terms does not limit the application of the disclosed embodiments, or their equivalents, to the context of processing components within a PCD or SoC. That is, although many of the embodiments are described in the context of a processing component, it is envisioned that proactive resource allocation and configuration ("PRAC") solutions may be applied to any functional component within a PCD or SoC including, but not limited to, a modem, a camera, a wireless network interface controller ("WNIC"), a display, a video encoder, a peripheral device, a battery, etc.

In this description, it will be understood that the terms "thermal" and "thermal energy" may be used in association with a device or component capable of generating or dissipating energy that can be measured in units of "temperature." Moreover, it will be understood that the terms "thermal footprint," "thermal dynamics" and the like may be used within the context of the thermal relationship between two or more components within a PCD and may be quantifiable in units of temperature. Consequently, it will further be understood that the term "temperature," with reference to some standard value, envisions any measurement that may be indicative of the relative warmth, or absence of heat, of a "thermal energy" generating device or the thermal relationship between components. For example, the "temperature" of two components is the same when the two components are in "thermal" equilibrium.

In this description, the terms "thermal mitigation technique(s)," "thermal policies," "thermal management," "thermal mitigation measure(s)," "throttling to a performance level," "thermal mitigation decision" and the like are essentially used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals. Embodiments of the PRAC solution may proactively schedule workloads, allocate workloads, configure processor settings, etc. based on a thermal policy goal.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "performance setting," "bin setting," "power level" and the like are used interchangeably to reference the power/performance level supplied to a processing component. Embodiments of the PRAC solution may configure a processing component to operate at a given power level, for example, based on profile data associated with a running application.

Embodiments of a PRAC solution work to make a heuristic platform level scheduler component deterministically aware of a workload associated with a running application program such that tasks may be efficiently scheduled to resources. PRAC solutions leverage a program profile in an execution environment to dynamically influence scheduling decisions and performance settings, thereby optimizing performance output and power consumption of a running program associated with the program profile.

A program profile used by a PRAC embodiment essentially defines the workload processing requirements of the running application over time. A platform scheduler system component that makes resource allocation decisions in view of the program profile data may avoid under-allocation of processing resources that leads to slow performance and/or over-allocation of processing resources that leads to unnecessary power consumption.

Some PRAC embodiments leverage performance API calls that are instrumented directly into an application program by a compiler/linker. The PRAC solution may subsequently invoke the embedded performance APIs at opportune times during the execution of the application program on a target device, thereby assisting a platform scheduler in decisions related to resource availability and performance settings.

FIG. 1 is a functional block diagram illustrating an embodiment of an on-chip system for implementing proactive resource allocation and configuration ("PRAC") methodologies in a system on a chip ("SoC") 102. Embodiments of the PRAC solution advantageously leverage a-posteriori gathered data in a profile data set to make efficient a-priori decisions regarding workload allocations and resource settings during execution of an application.

As can be seen in the high level illustration of FIG. 1, a profile guided optimized application ("PGO optimized application") 215 may be running in an execution environment of chip 102. As would be understood by one of ordinary skill in the art, a running application may be stored in memory (not shown in FIG. 1) and executed by one or more cores, such as cores 222, 224, 226, 228 of CPU 110. As would further be understood by one of ordinary skill in the art, as an application is executed it may require access to one or more resources 210 (e.g., memory, modem, GPU, CPU, etc.). Such requests or "calls" may be effected via an application program interface (an "API"), as would be understood by one of ordinary skill in the art.

Returning to the FIG. 1 illustration, the PGO optimized application 215 is associated with a profile dataset 27 that is useful for indicating upcoming requirements of the application 215 as it is being executed. Unlike prior art solutions that rely on knowledge of past behavior of an application to predict future needs of the application, embodiments of a PRAC solution also look to the profile dataset 27 to make proactive decisions regarding resource allocations and settings based on known, or highly probable, upcoming requirements. In some PRAC embodiments, the profile dataset 27 may reside within the object code of the PGO optimized application 215 itself, having been compiled from the source code. In other PRAC embodiments, the profile dataset 27 may exist separate from the PGO optimized application 215.

It is an advantage of PRAC solutions that resources may begin ramping up (or ramping down) to optimum settings prior to being required (or released) by the PGO optimized application 215 and, as such, performance level and power consumption of the system 102 may be optimized for a given QoS level. Similarly, it is an advantage of PRAC solutions that the resources best positioned to service a need of the PGO optimized application 215 may be determined as the need is approaching—for example, based on knowledge of processing requirements for an upcoming workload thread, PRAC solutions may work with a platform scheduler 205 to allocate the workload thread to a particular processing component selected in view of thermal hotspots on other processing components. Notably, a PRAC solution may drive the same workload thread to an entirely different processing component in a subsequent execution of the PGO optimized application 215 depending on the thermal footprint of the system 102 at that time.

In operation, the monitor module 114 (which may form part of the runtime 101) monitors the execution progress of the PGO optimized application 215 and informs the PGO scheduler runtime module 101. With knowledge of upcoming or pending needs of the PGO optimized application 215, the PGO scheduler runtime module 101 may rely on the profile dataset 27 to anticipate optimum resource allocations and settings. Accordingly, the PGO scheduler runtime module 101 may work with the platform scheduler 205 to allocate workloads to the particular resource 210 (CPU 110 may also be considered a resource 210) best positioned to process the workload. Similarly, the PGO scheduler runtime module 101 may work with the DVFS module 26 to preemptively adjust the settings of the resources 210 to accommodate the upcoming workloads. For example, the DVFS module 26 may ramp up a particular resource 210 so that it is "ready to go" when the upcoming workload is actually allocated to it. Alternatively, the DVFS module 26 may ramp down a particular resource 210 at an expedited rate when a workload is finished or de-allocated. In these ways, the PRAC solution may minimize power consumption in view of delivering a certain level of functionality to the user of PCD 100.

A more detailed explanation of how a PGO optimized application 215 and its profile dataset 27 may be generated and executed is described below in conjunction with FIGS. 3 through 6.

Figure 2:
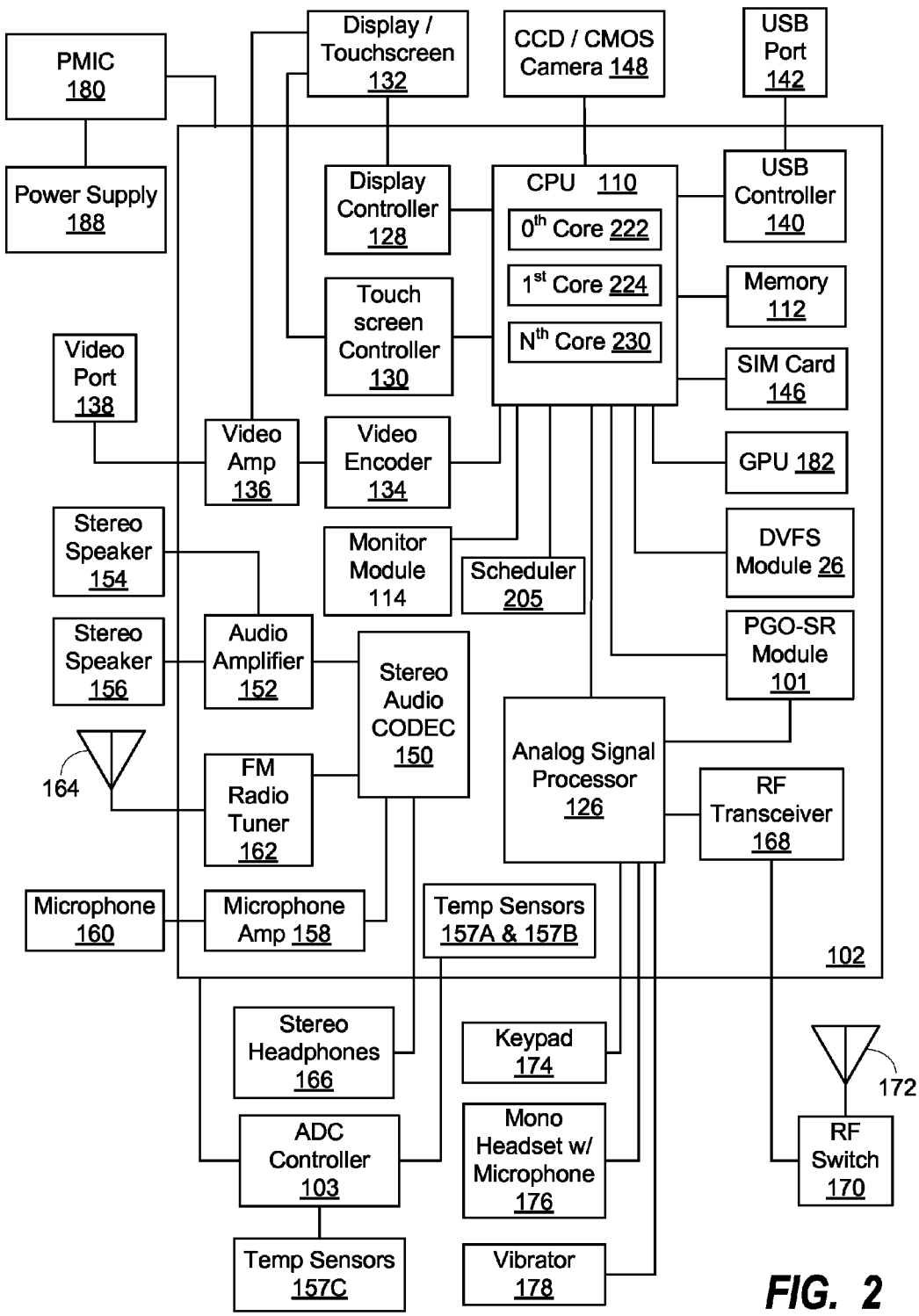
FIG. 2 is a functional block diagram illustrating an exemplary, non-limiting aspect of a PCD in the form of a wireless telephone for implementing methods and systems for proactive resource allocation and configuration ("PRAC") in the SoC of FIG. 1.

FIG. 2 is a functional block diagram illustrating an exemplary, non-limiting aspect of a PCD in the form of a wireless telephone for implementing methods and systems for proactive resource allocation and configuration ("PRAC") in the SoC of FIG. 1. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of, or in addition to, a CPU 110, a digital signal processor ("DSP") may also be employed as understood by one of ordinary skill in the art. Notably, it is envisioned that homogeneous and heterogeneous processing systems may be controllable by a PRAC solution.

In general, the dynamic voltage and frequency scaling ("DVFS") module 26 may be responsible for implementing throttling techniques to individual processing components or resources 210, such as cores 222, 224, 230 in an incremental fashion to help a PCD 100 optimize its power level and maintain a high level of functionality. The particular settings (and timing of any adjustments) implemented by the DVFS module 26 may be prescribed by a PGO scheduler runtime ("PGO-SR") module 101 relying on one or more profile data sets associated with running applications that were optimized according to a PRAC solution.

The monitor module 114 communicates with multiple operational sensors (e.g., thermal sensors 157A, 157B) distributed throughout the on-chip system 102 and with the CPU 110 of the PCD 100 as well as with the PGO-SR module 101. In some embodiments, monitor module 114 may also monitor "off-chip" sensors 157C for temperature readings associated with a touch temperature of PCD 100. Moreover, monitor module 114 may monitor sensors 157 for detecting power consumption levels or memory bandwidth availability. The PGO-SR module 101 may work with the monitor module 114 to identify state changes in one or more thermal factors and, using profile data stored in memory 112, instruct the platform scheduler 205 to allocate resources accordingly.

As illustrated in FIG. 2, a display controller 128 and a touch screen controller 130 are coupled to the digital signal processor 110. An optional touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A, 157B as well as one or more external, off-chip thermal sensors 157C. The on-chip thermal sensors 157 may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157 may comprise one or more thermistors. The thermal sensors 157 may produce a voltage drop that is converted to digital signals with an analog-to-digital converter ("ADC") controller 103. However, other types of thermal sensors 157A, 157B, 157C may be employed without departing from the scope of the invention.

The DVFS module(s) 26 and PGO-SR module(s) 101 may comprise software which is executed by the CPU 110. However, the DVFS module(s) 26 and PGO-SR module(s) 101 may also be formed from hardware and/or firmware without departing from the scope of the invention. The PGO-SR module(s) 101 in conjunction with the DVFS module(s) 26 and scheduler module 205 may be responsible for workload allocation and resource settings that may help a PCD 100 avoid excessive power consumption while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more PGO-SR module(s) 101 and DVFS module(s) 26 and scheduler module(s) 205. These instructions that form the module(s) 101, 26, 205 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein when configured to do so.

Figure 3:
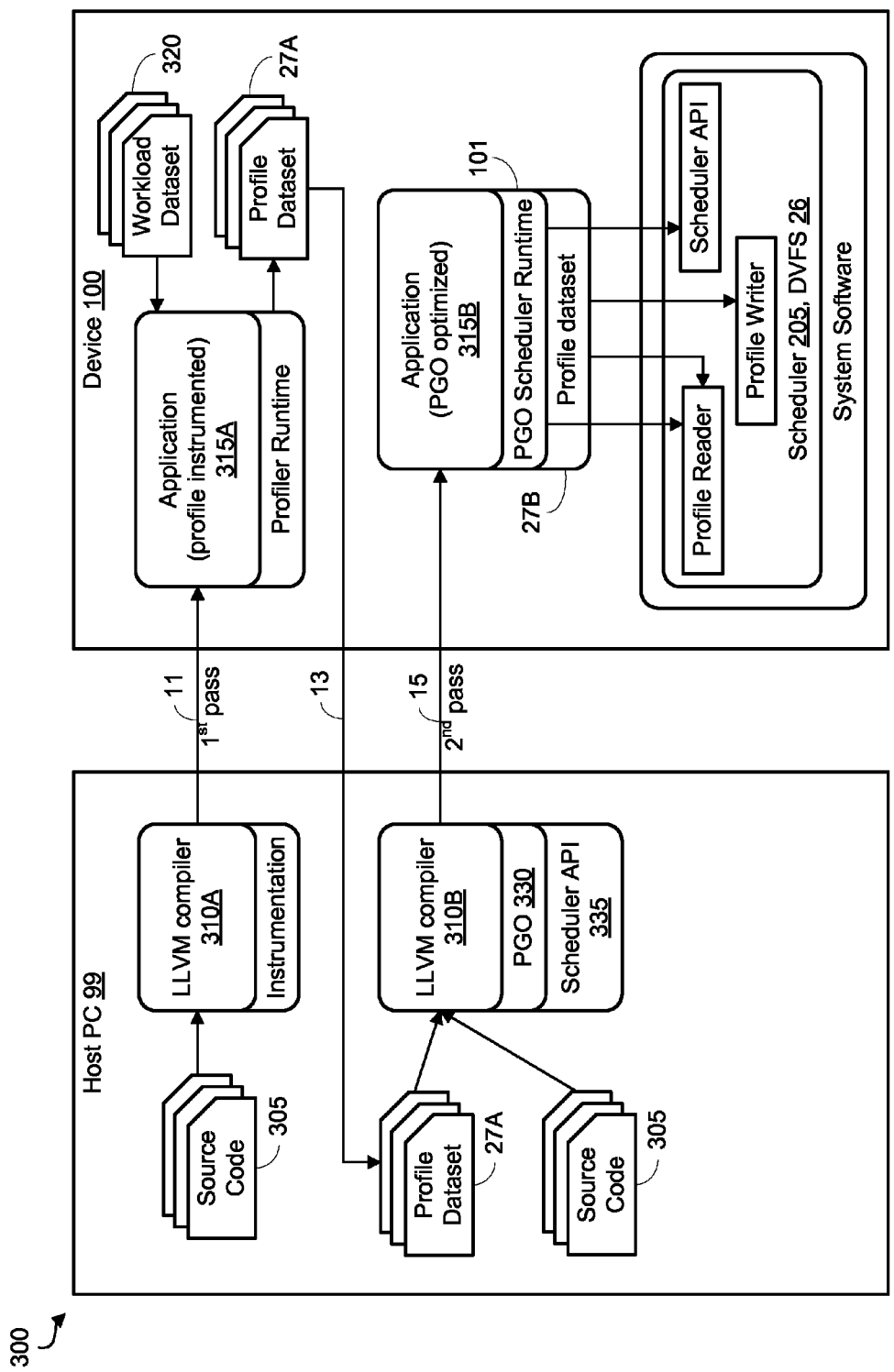
FIG. 3 is a functional block diagram illustrating an exemplary method for proactive resource allocation and configuration ("PRAC") using compiler instrumentation to generate a profile dataset for an application.

FIG. 3 is a functional block diagram illustrating an exemplary method 300 for proactive resource allocation and configuration ("PRAC") using compiler instrumentation to generate a profile data set for an application. In the method 300, a program guided optimization ("PGO") feature of an LLVM compiler 310A on a host computer 99 is used to compile source code 305. The LLVM compiler 310A runs on the source code 305 of an application to generate an object code executable by a processor on a target device 100. As part of the compilation step, the instrumentation may be leveraged to insert calls to a profiler runtime and counter increments in certain places in the source code 305, thereby embedding those calls and counter increments in the resulting executable object code. The calls will be used to collect information about the application 315A as it runs on target device 100, such as counts of executions of areas of the program 315A in the forms of basic blocks, functions, indirect function calls, threads, thread profiles, memory usage, cache usage, etc. The object code, i.e. profile instrumented application 315A, is then passed 11 to target device 100 where it may be executed.

The application 315A with its linked in profiler runtime is then executed on the target device 100 using one or more workload datasets 320 representative of probable workloads. For each workload dataset 320, an instrumentation-based profile dataset 27A is generated by the profiler runtime. The instrumentation-based profile dataset(s) 27A may then be provided back 13 to the host computer 99 so that the application 315A may be recompiled and relinked by LLVM compiler 310B. The compiler 310B looks at the source code 305 and the profile data set 27A and generates a set of profile guided optimizations 330 to the source code. The profile dataset 27A may contain data indicative of what functions were most commonly called by the application 315A, hot paths for the application 315A, block counts for LLVM blocks, call path info, etc. Using the profile dataset 27A to generate the PGOs 330, the PRAC embodiment may effectively transform the source code so that a more efficient object code, i.e. a PGO optimized application 315B, is generated. For example, the PGO optimized application 315B, when compared to the predecessor profile instrumented application 315A, may include inline function calls that mitigate the need for full function call setup and tear down, checks for common switch statements before invocation of a switch, insertion of instrumentation calls to an API 335 so that when a hot piece of code or important portion of the application 315B is going to run the application 315B itself will call the API 335.

Once the PGO optimized application 315B is generated, it may be provided 15 to the target device 100. The PGO optimized application 315B is the form of the application 315 that may be executed on the target device 100 with optimal resource allocation and configuration that leads to a high QoS. Advantageously, because of the initial instrumentation based optimization and insertion of the scheduler APIs 335, the PGO scheduler runtime 101 may actually call into system software to instruct the software when to turn cores on/off, indicate how many threads may be required in the near future, anticipated memory behavior, etc. Such hints to the system software may enable hardware optimization that results in power and performance optimization of the target device 100.

Notably, the profile dataset 27B may form part of the application 315B in some embodiments while in other embodiments it may "live" in association with the application 315B. For embodiments that do not embed the calls for various resources or hints for upcoming processing requirements into the application 315B itself, either the system software or the profile runtime may read the profile dataset 27B on the target device 100 at runtime in order to make proactive resource allocation and configuration decisions.

It is envisioned that in some PRAC embodiments the profile dataset 27B may be updated and revised over time (perhaps by monitor module 114) in order to achieve further optimizations such as for additional workloads. In addition to the reading of the profile dataset 27B, as the application 315B lives on the target over time, the behavior of the application (resulting from the particular target device 100 and/or how the application is being used by the user) may provide more information that can be written back to the profile dataset 27B and relied upon for optimization of future executions.

Figure 4:
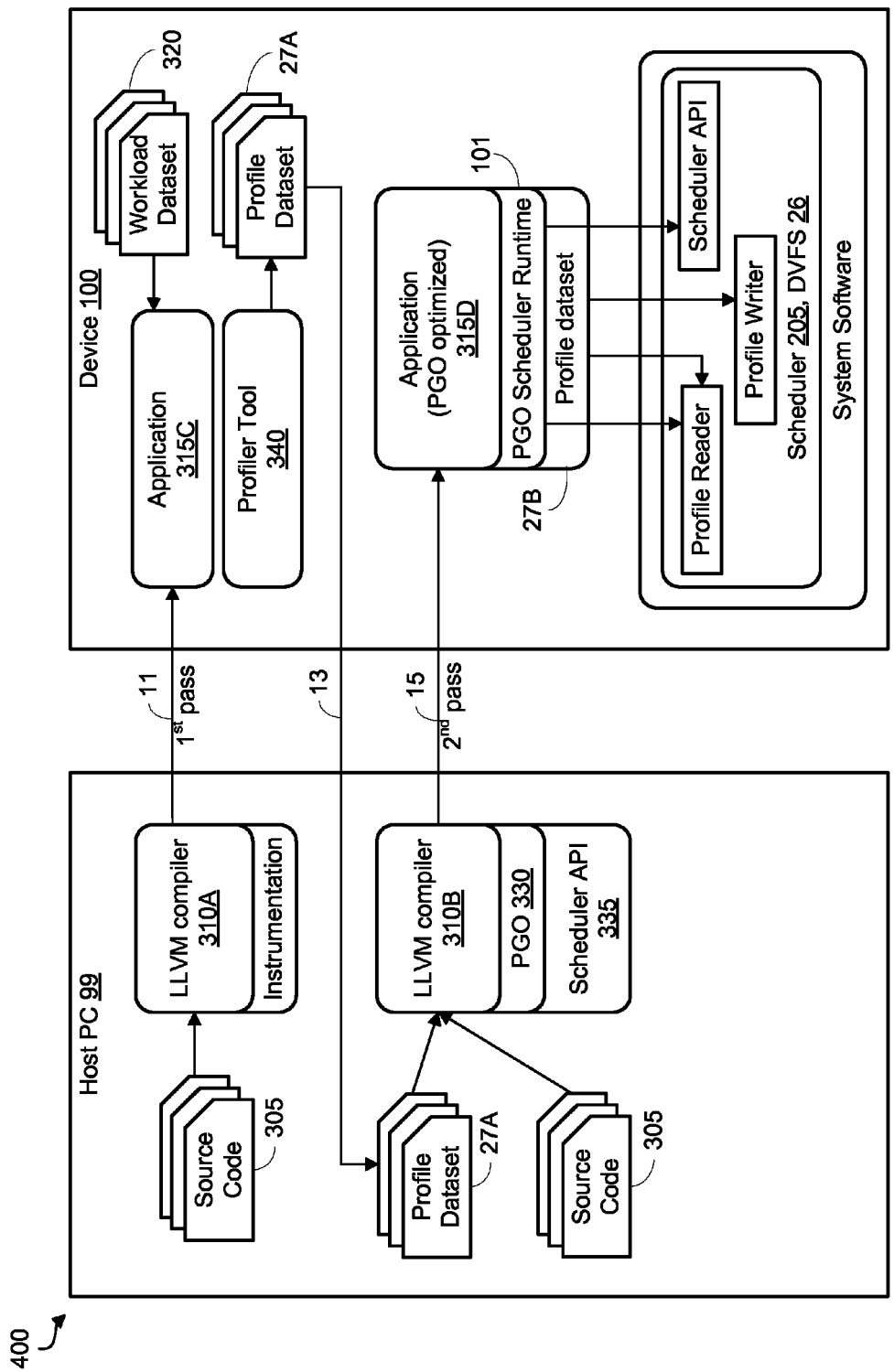
FIG. 4 is a functional block diagram illustrating an exemplary method for proactive resource allocation and configuration ("PRAC") using a compiler and a profile tool of the target device to generate a profile dataset for an application.

FIG. 4 is a functional block diagram illustrating an exemplary method 400 for proactive resource allocation and configuration ("PRAC") using a compiler 310 and a profile tool 340 of the target device 100 to generate a profile dataset 27 for an application. In the method 400, an LLVM compiler 310A on a host computer 99 is used to compile source code 305. The LLVM compiler 310A runs on the source code 305 of an application to generate an object code executable by a processor on a target device 100. The object code, i.e. application 315C, is then passed 11 to target device 100 where it may be executed.

The application 315C is then executed on the target device 100 using multiple workload datasets 320 representative of a range of probable workloads. For each workload dataset 320, a sample-based profile dataset 27A is generated by the profiler tool 340 in response to the behavior of the application 315C as it is executed. The sample-based profile dataset 27A may then be provided 13 to the host computer 99 so that the application 315C may be recompiled and relinked by LLVM compiler 310B. The compiler 310B looks at the source code 305 and the profile data set 27A and generates a set of profile-guided optimizations 330 to the source code. The profile dataset 27A may contain data indicative of what functions were most commonly called by the application 315C, hot paths for the application 315C, block counts for LLVM blocks, call path info, etc. Using the profile dataset 27A to generate the PGOs 330, the PRAC embodiment may effectively transform the source code so that a more efficient object code, i.e. a PGO optimized application 315D, is generated. For example, the PGO optimized application 315D, when compared to the predecessor application 315C, may include inline function calls that mitigate the need for full function call setup and tear down, checks for common switch statements before invocation of a switch, insertion of instrumentation calls to an API 335 so that when a hot piece of code or important portion of the application 315D is going to run the application 315D itself will call the API 335.

Once the PGO optimized application 315D is generated, it may be provided 15 to the target device 100. The PGO optimized application 315D is the form of the application 315 that may be executed on the target device 100 with optimal resource allocation and configuration that leads to a high QoS. Advantageously, because of the initial instrumentation based optimization and insertion of the scheduler APIs 335, the PGO scheduler runtime 101 may actually call into system software to instruct the software when to turn cores on/off, how many threads may be required in the near future, anticipated memory behavior, etc. Such hints to the system software may enable hardware optimization that results in power and performance optimization of the target device 100.

Notably, the profile dataset 27B may form part of the application 315D in some embodiments while in other embodiments it may "live" in association with the application 315D. For embodiments that do not embed the calls for various resources or hints for upcoming processing requirements into the application 315D itself, either the system software or the profile runtime may read the profile dataset 27B on the target device 100 at runtime in order to make proactive resource allocation and configuration decisions.

It is envisioned that in some PRAC embodiments the profile dataset 27B may be updated and revised over time in order to achieve further optimizations. In addition to the reading of the profile dataset 27B, as the application 315D lives on the target over time, the behavior of the application (resulting from the particular target device 100 and/or how the application is being used by the user) may provide more information that can be written back to the profile dataset 27B and relied upon for optimization of future executions.

Essentially, the exemplary PRAC method 400 embodiment, as opposed to the exemplary method 300 embodiment, generates the profile dataset 27 without use of LLVM compiler instrumentation. Instead, the exemplary PRAC method 400 leverages a profiler tool 340 that, while it may include portions hosted by the computer 99, mainly runs on the target device 100 to capture profile data 27 while the program 315C runs. Similar to the instrumentation associated with LLVM compiler 310A in the FIG. 3 embodiment, the profiler tool 340 samples system resources, checks clock frequency, monitors thread counts, determines hot paths, etc.

Figure 5:
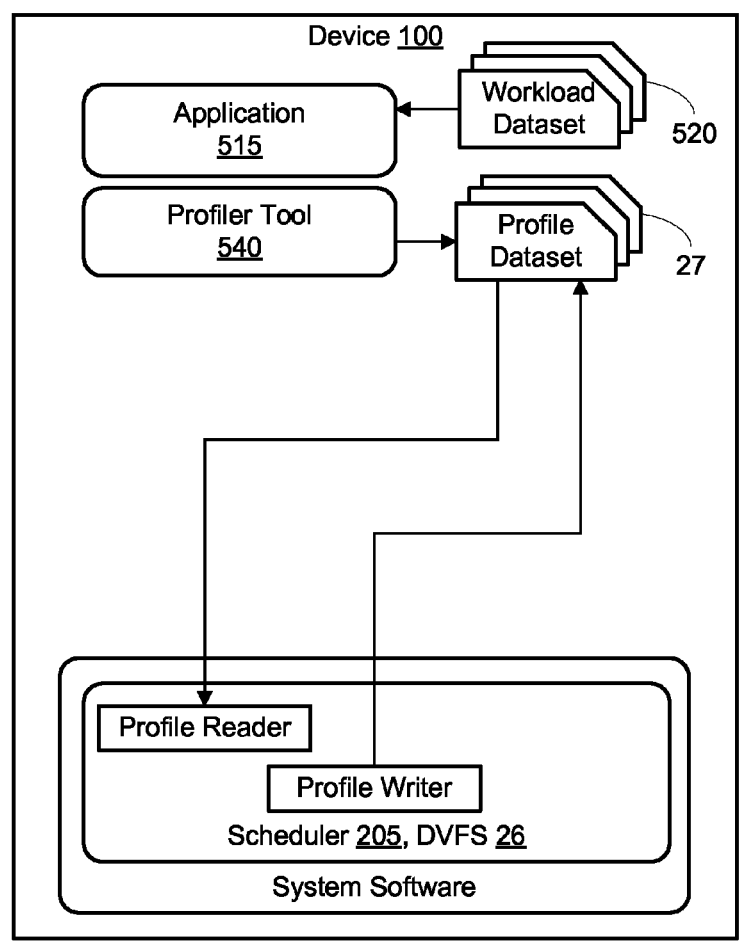
FIG. 5 is a functional block diagram illustrating an exemplary method for proactive resource allocation and configuration ("PRAC") using only a profile tool of the target device to generate a profile dataset for an application.

FIG. 5 is a functional block diagram illustrating an exemplary method 500 for proactive resource allocation and configuration ("PRAC") using only a profile tool 540 of the target device 100 to generate a profile dataset 27 for an application 315. Notably, the exemplary PRAC method 500 may be useful for applications that are not available for first pass or second pass LLVM compiling on a host computer. For example, it is envisioned that applications developed by third party developers and provided to a target device 100 may benefit from optimization provided through a PRAC methodology.

Similar to a portion of the method 400 embodiment described above, the method 500 embodiment uses a profiler tool 540 to develop a profile dataset 27 as application 515 is executed in accordance with workload datasets 520. Using the profile dataset 27, the system software (e.g., browser runtime, high level operating system, etc.) may provide scheduler module 205 and/or DVFS module 26 and/or a separate runtime module (not depicted) with information that enables proactive workload allocation, processor configuration and the like. Advantageously, subsequent executions of application 515 using the profile dataset 27 as a guide for anticipating and efficiently fulfilling the demands of the application 515 may be monitored by profiler tool 540 and used to update and refine profile dataset 27.

Figure 6:
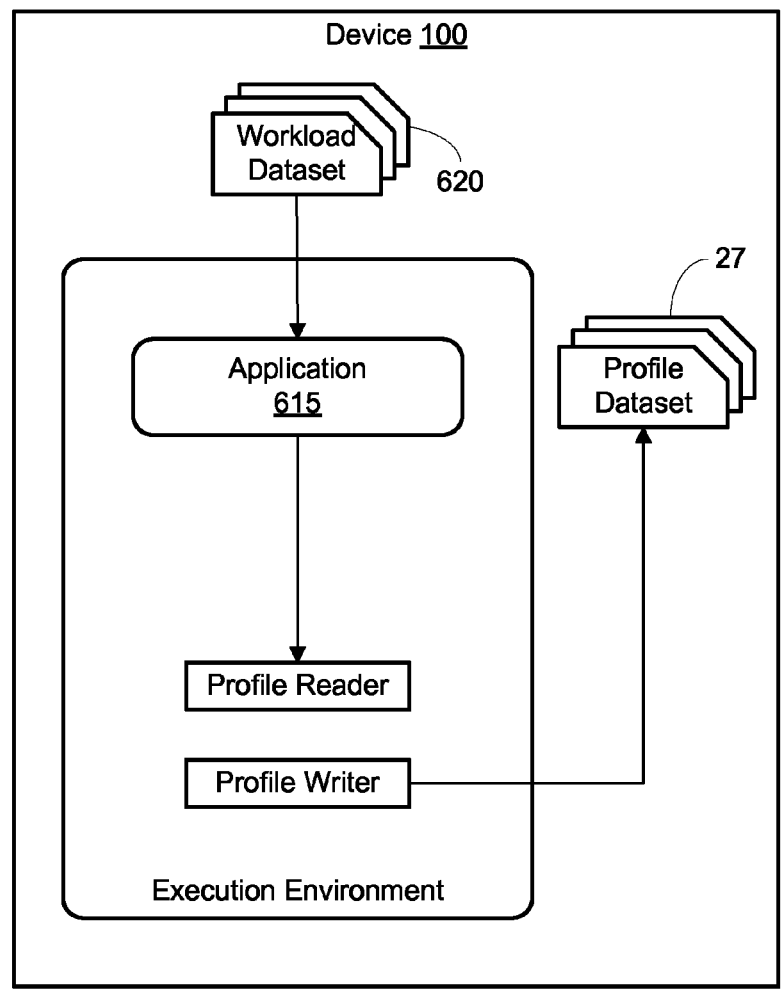
FIG. 6 is a functional block diagram illustrating an exemplary method for proactive resource allocation and configuration ("PRAC") in a generic execution environment using profile data.

FIG. 6 is a functional block diagram illustrating an exemplary method 600 for proactive resource allocation and configuration ("PRAC") in a generic execution environment using profile data 27. It is envisioned that embodiments of a PRAC solution may be useful in any execution environment and, as such, are not limited to the particular execution environments described or suggested above. As illustrated in FIG. 6, a profile dataset 27 may be generated based on monitoring of an application 615 during execution of various workload datasets 620. As the profile dataset 27 is refined over time in view of subsequent executions of application 615 using the dataset 27, the efficiency at which resources are configured and workloads allocated may be improved.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously with) other steps without departing from the scope and spirit of the invention. In some instances, certain steps may be omitted or not performed without departing from the invention. Further, words such as "thereafter", "then", "next", "subsequently" etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the figures and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for proactive resource allocation and configuration in a system on a chip ("SoC"), the method comprising:
    compiling and linking a profile instrumented application with a compiler comprising a profile guided optimization feature, wherein compiling and linking the profile instrumented application comprises inserting calls to a profiler runtime;
    executing the profile instrumented application on a target device including the SoC using a plurality of workload datasets, wherein the workload datasets are representative of a range of probable workloads;
    monitoring the profile instrumented application during its execution and, based on recognition of the inserted calls, generating an instrumentation-based profile dataset in association with each of the plurality of workload datasets;
    recompiling and relinking the profile instrumented application based on the instrumentation-based profile datasets, wherein recompiling and relinking the profile instrumented application comprises creating a set of profile guided optimizations to the source code and generating an optimized application;
    executing the optimized application and generating a revised profile dataset, wherein the revised profile dataset is used to control the target device for workload allocation and resource configuration by instructing adjustment of dynamic voltage and frequency scaling ("DVFS") to one or more components in the SoC prior to allocation of a workload associated with the application, wherein the revised profile dataset forms part of object code of the optimized application;
    writing information back to the revised profile dataset of the optimized application to update the revised profile dataset of the optimized application in response to behavior of the optimized application in execution.

2. The method of claim 1, wherein the compiler is a profile guided optimization ("PGO") compiler.

3. The method of claim 1, wherein instructing adjustment of DVFS comprises initiating ramping up a voltage to a component in the SoC to a level that will be required when the workload is allocated.

4. The method of claim 1, wherein the target device is a portable computing device in the form of a mobile phone.

5. A system for proactive resource allocation and configuration in a system on a chip ("SoC"), the system comprising:
    a first processor in communication with a first memory component, the first processor configured to:
        compile and link a profile instrumented application with a compiler comprising a profile guided optimization feature, wherein compiling and linking the profile instrumented application comprises inserting calls to a profiler runtime; and
        recompile and relink the profile instrumented application based on instrumentation-based profile datasets, wherein recompiling and relinking the profile instrumented application comprises creating a set of profile guided optimizations to the source code and generating an optimized application;
    a second processor in communication with a second memory component, the second processor configured to:
        execute the profile instrumented application on a target device using a plurality of workload datasets, wherein the workload datasets are representative of a range of probable workloads; and execute the optimized application and generate a revised profile dataset, wherein the profile dataset is used to control the target device for workload allocation and resource configuration by instructing adjustment of dynamic voltage and frequency scaling ("DVFS") to one or more components in the SoC prior to allocation of a workload associated with the application, wherein the revised profile dataset forms part of object code of the optimized application; and a monitor module configured to:

monitor the profile instrumented application during its execution and, based on recognition of the inserted calls, generate an instrumentation-based profile dataset in association with each of the plurality of workload datasets; and write information back to the revised profile dataset of the optimized application to update the revised profile dataset of the optimized application in response to behavior of the optimized application in execution.

6. The system of claim 5, wherein the compiler is a profile guided optimization ("PGO") compiler.

7. The system of claim 5, wherein instructing adjustment of DVFS comprises initiating ramping up a voltage to a component in the SoC to a level that will be required when the workload is allocated.

8. The system of claim 5, wherein the target device is a portable computing device in the form of a mobile phone.

9. A system for proactive resource allocation and configuration in a system on a chip ("SoC"), the method comprising:

means for compiling and linking a profile instrumented application with a compiler comprising a profile guided optimization feature, wherein compiling and linking the profile instrumented application comprises inserting calls to a profiler runtime;

means for executing the profile instrumented application on a target device including the SoC using a plurality of workload datasets, wherein the workload datasets are representative of a range of probable workloads;

means for monitoring the profile instrumented application during its execution and, based on recognition of the inserted calls, generating an instrumentation-based profile dataset in association with each of the plurality of workload datasets;

means for recompiling and relinking the profile instrumented application based on the instrumentation-based profile datasets, wherein recompiling and relinking the profile instrumented application comprises creating a set of profile guided optimizations to the source code and generating an optimized application;

means for executing the optimized application and generating a revised profile dataset, wherein the revised profile dataset is used to control the target device for workload allocation and resource configuration by instructing adjustment of dynamic voltage and frequency scaling ("DVFS") to one or more components in the SoC prior to allocation of a workload associated with the application, wherein the revised profile dataset forms part of object code of the optimized application; and means for writing information back to the revised profile dataset of the optimized application to update the revised profile dataset of the optimized application in response to behavior of the optimized application in execution.

10. The system of claim 9, wherein the compiler is a profile guided optimization ("PGO") compiler.

11. The system of claim 9, wherein instructing adjustment of DVFS comprises initiating ramping up a voltage to a component in the SoC to a level that will be required when the workload is allocated.

12. The system of claim 9, wherein the target device is a portable computing device in the form of a mobile phone.

13. The system of claim 10, wherein the target device is a portable computing device in the form of a mobile phone.

14. A computer program product comprising a computer usable medium having a computer readable program code embodied therein, said computer readable program code adapted to be executed to implement a method for proactive resource allocation and configuration in a system on a chip ("SoC"), said method comprising:

compiling and linking a profile instrumented application with a compiler comprising a profile guided optimization feature, wherein compiling and linking the profile instrumented application comprises inserting calls to a profiler runtime;

executing the profile instrumented application on a target device including the SoC using a plurality of workload datasets, wherein the workload datasets are representative of a range of probable workloads;

monitoring the profile instrumented application during its execution and, based on recognition of the inserted calls, generating an instrumentation-based profile dataset in association with each of the plurality of workload datasets;

recompiling and relinking the profile instrumented application based on the instrumentation-based profile datasets, wherein recompiling and relinking the profile instrumented application comprises creating a set of profile guided optimizations to the source code and generating an optimized application;

executing the optimized application and generating a revised profile dataset, wherein the revised profile dataset is used to control the target device for workload allocation and resource configuration by instructing adjustment of dynamic voltage and frequency scaling ("DVFS") to one or more components in the SoC prior to allocation of a workload associated with the application, wherein the revised profile dataset forms part of object code of the optimized application; and writing information back to the revised profile dataset of the optimized application to update the revised profile dataset of the optimized application in response to behavior of the optimized application in execution.

15. The computer program product of claim 14, wherein the compiler is a profile guided optimization ("PGO") compiler.

16. The computer program product of claim 14, wherein instructing adjustment of DVFS comprises initiating ramping up a voltage to a component in the SoC to a level that will be required when the workload is allocated.

17. The computer program product of claim 14, wherein the target device is a portable computing device in the form of a mobile phone.

18. The computer program product of claim 15, wherein the target device is a portable computing device in the form of a mobile phone.

* * * * *